United States Patent [19]

Roberts

[11] Patent Number: 4,457,132
[45] Date of Patent: Jul. 3, 1984

[54] CONTROL APPARATUS

[75] Inventor: Maurice P. Roberts, Lafayette, Ind.

[73] Assignee: TRW Inc., Cleveland, Ohio

[21] Appl. No.: 318,345

[22] Filed: Nov. 5, 1981

[51] Int. Cl.³ .......................... B62D 5/06; F01C 1/02
[52] U.S. Cl. ...................................... 60/384; 60/431; 180/132
[58] Field of Search .................. 60/384, 431; 180/132

[56] References Cited

U.S. PATENT DOCUMENTS

| 3,651,885 | 3/1972 | Lang . | |
|---|---|---|---|
| 3,895,888 | 7/1975 | Roberts . | |
| 3,991,846 | 11/1976 | Chichester et al. . | |
| 4,023,646 | 5/1977 | Heisig | 180/132 |
| 4,184,333 | 1/1980 | Blaha et al. . | |

FOREIGN PATENT DOCUMENTS

| 2639853 | 3/1978 | Fed. Rep. of Germany | 180/132 |
|---|---|---|---|
| 2057374 | 4/1981 | United Kingdom | 180/132 |
| 2069429 | 8/1981 | United Kingdom | 180/132 |

OTHER PUBLICATIONS

Pp. M-4060 through M-4060-3 of a 1961 catalog published by Vickers Incorporated.
Pp. 8 and 9 of a 1973 catalog published by Vickers Incorporated.

Primary Examiner—Douglas Hart
Attorney, Agent, or Firm—Yount & Tarolli

[57] ABSTRACT

Upon initiation of a steering operation, a gerotor gear set rotates a directional control valve to an actuated condition. Initial rotation of the directional control valve actuates a switch assembly under the influence of forces transmitted from the directional control valve. The switch assembly is located in one section of a housing and the directional control valve is located in another section of the housing. The two housing sections are connected in fluid communication so that there are no seals to impede actuation of the switch assembly upon rotation of the directional control valve. The switch assembly and its housing section are rotatable together with the directional control valve to adjust the initial position of the directional control valve relative to the other housing section. In one embodiment of the invention, actuation of the switch assembly effects operation of an electric motor to increase fluid flow from a pump to a steering control assembly. In another embodiment of the invention, actuation of the switch assembly effects operation of a priority valve to reduce fluid flow to an auxiliary apparatus and increase fluid flow to a steering control assembly.

46 Claims, 11 Drawing Figures

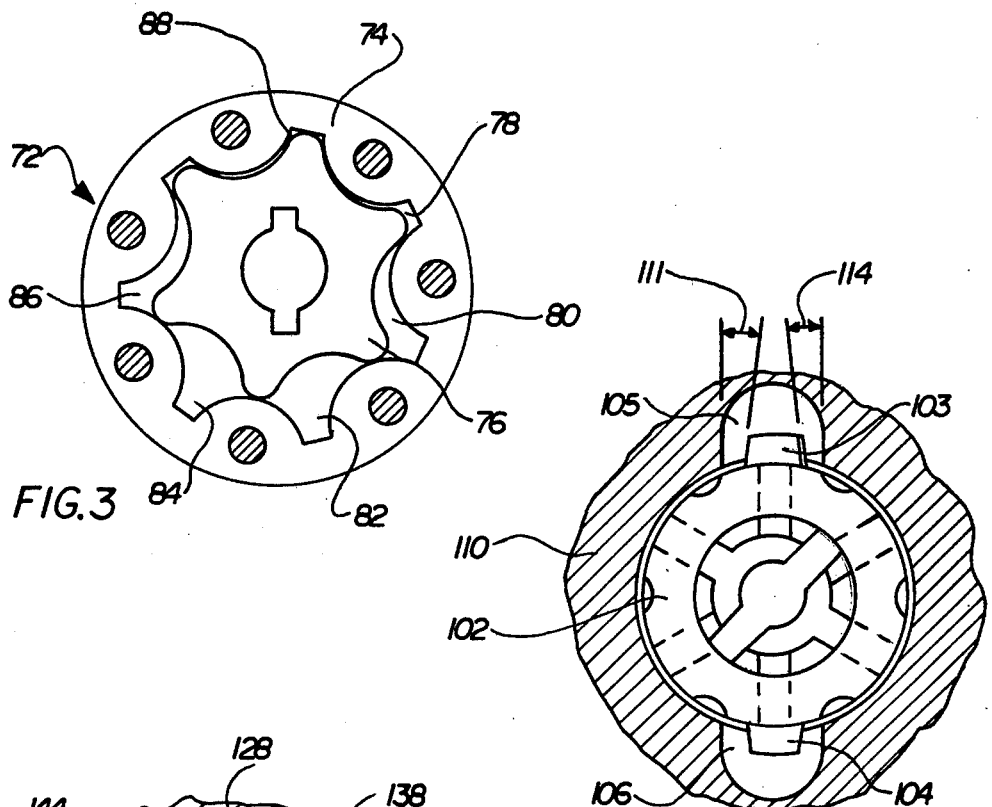
FIG.3
FIG.4
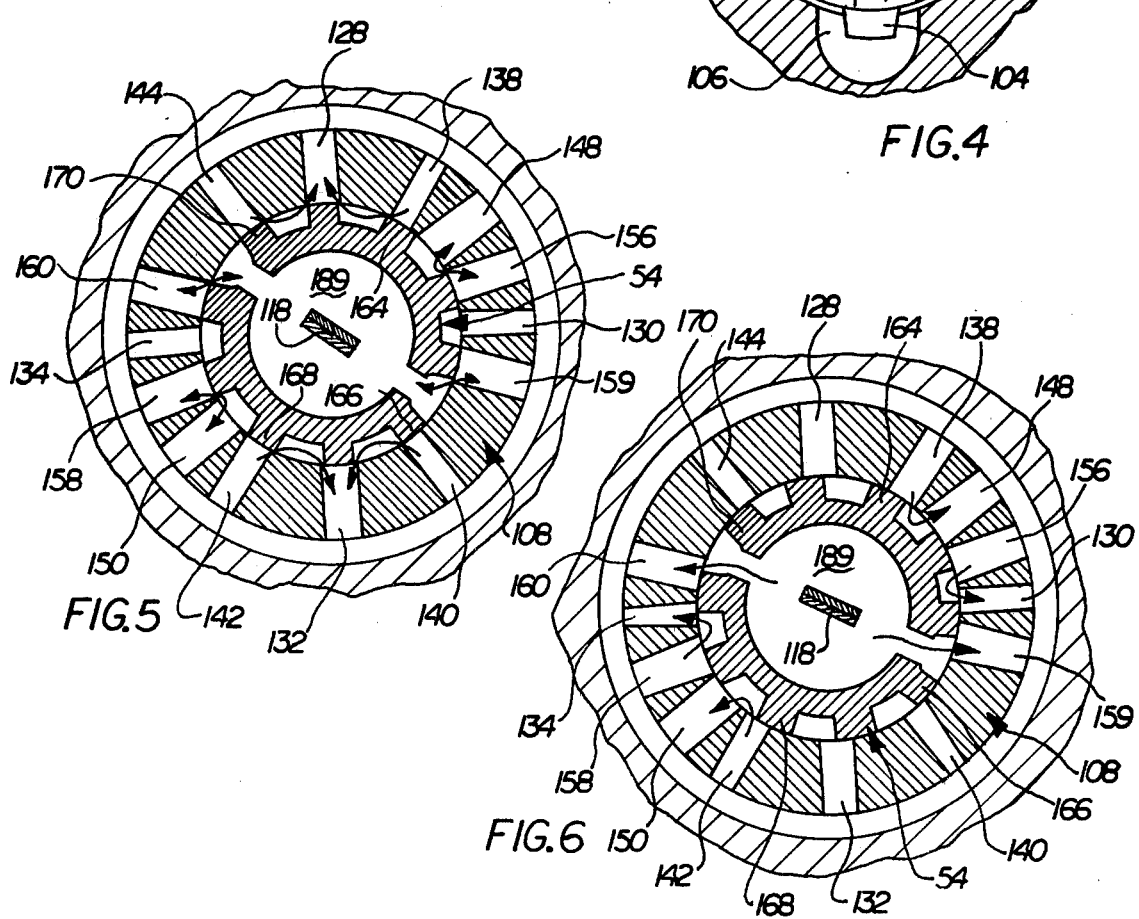
FIG.5
FIG.6

CONTROL APPARATUS

BACKGROUND OF THE INVENTION

The present invention relates to a new and improved control apparatus having a switch assembly which effects a control function upon actuation of a valve.

A known power steering apparatus includes a control assembly which is connected with an engine driven pump and with a motor which is connected to steerable vehicle wheels. The control assembly includes a gerotor gear set having internally and externally toothed gears. The gerotor gears are rotatable and orbital to meter fluid flow from the pump to the motor. A directional control valve is moved in response to actuation of the gerotor gear set upon initiation of a steering operation. When the vehicle wheels have been turned to an extent corresponding to the extent of rotation of the input shaft, a biasing spring returns the directional control valve to its neutral or initial position. Steering control assemblies which operate in this manner are disclosed in U.S. Pat. No. 3,895,888 and in German Offenlegungsschrift No. 1,553,287.

Power steering devices have been used in electric vehicles, such as fork lift trucks. In these vehicles, a power steering fluid supply pump may be driven by an electric motor. The motor continuously drives the pump even though the wheels of the vehicle are not being turned and there is no demand for steering fluid. Continuous operation of the motor to drive the power steering pump is objectionable because it constitutes an unnecessry drain on the vehicle battery.

In an effort to reduce the drain on the battery of an electric vehicle, it was suggested in U.S. Pat. No. 3,991,846 that a motor which drives the power steering pump be energized only during steering operations. In this patent, rotation of a steering wheel effects manual operation of a metering pump. Manual operation of the metering pump is effective to generate a fluid pressure which is directed to a control valve. This pressure actuates the control valve to direct fluid pressure from the manually actuated metering pump to a piston type actuator which changes the force exerted against a carbon pile type switch. Changing the force exerted against the carbon pile changes the resistance in an electrical circuit which energizes a motor to drive the power steering fluid supply pump.

SUMMARY OF THE PRESENT INVENTION

The present invention provides a new and improved control apparatus which actuates a switch upon movement of a valve member. The apparatus may be used to control operation of a fluid motor assembly to turn steerable vehicle wheels. In this environment, initiation of a steering operation actuates a gerotor gear set to meter fluid flow to the motor assembly. Initial actuation of the gerotor gear set moves a directional control valve from an initial position to an actuated position to effect turning movement of the vehicle wheels.

In accordance with a feature of the invention, a switch assembly is provided to effect a control function in response to movement of the directional control valve from its initial position. A switch actuator is connected with the directional control valve and is moved under the influence of forces transmitted from the directional control valve. In one embodiment of the invention, actuation of the switch assembly effects operation of an electric motor to increase fluid flow from a pump. In another embodiment of the invention, actuation of the switch assembly effects operation of a priority valve to increase the rate at which fluid is directed to a steering controller. Control functions which differ from the foregoing could be initiated in response to actuation of the switch assembly.

Adjustment of the initial position of the directional control valve is facilitated by providing a two-section housing which encloses both the directional control valve and the switch assembly. The section of the housing in which the switch assembly is located can be moved relative to the section of the housing in which the directional control valve is located. This movement shifts the directional control valve to adjust its initial position. The two housing sections are advantageously connected in fluid communication with each other to eliminate the need for seals to prevent fluid flow between the two housing sections. This enables the switch actuator to be freely moved relative to the housing sections upon operation of the directional control valve.

Accordingly, it is an object of this invention to provide a new and improved control apparatus for effecting actuation of a switch upon movement of a valve member.

Another object of this invention is to provide a new and improved apparatus for effecting operation of a fluid motor to turn steerable vehicle wheels upon movement of a valve member from an initial position and wherein a switch is actuated by movement of the valve member from the initial position.

Another object of this invention is to provide a new and improved apparatus as set forth in the preceding object and wherein actuation of the switch effects operation of an electric motor to increase fluid flow from a pump.

Another object of this invention is to provide a new and improved apparatus for use in turning steerable vehicle wheels and operating an auxiliary apparatus and wherein movement of a steering control valve ports fluid to a power steering motor and actuates a switch to effect operation of a priority valve.

Another object of this invention is to provide a new and improved control unit for controlling fluid flow to a motor and providing an electrical output signal to effect a control function and wherein the control unit includes a housing having a first section in which a rotatable steering control valve is located and a second section in which a switch assembly is located, the second housing section being rotatable relative to the first housing section to vary the initial position of the valve while maintaining the angular relationship between the valve and the switch assembly substantially constant.

BRIEF DESCRIPTION OF THE DRAWINGS

The foregoing and other objects and features of the present invention will become more apparent upon a consideration of the following description taken in connection with the accompanying drawings wherein:

FIG. 3 is a plan view, taken generally along the line 3—3 of FIG. 2, illustrating the construction of a gerotor gear set which is connected with the directional control valve and meters fluid flow to a power steering motor during a steering operation;

FIG. 4 is a fragmentary illustration, taken generally along the line 4—4 of FIG. 2, illustrating the relationship between surfaces which limit the extent to which the directional control valve can be rotated upon initiation of a steering operation;

FIG. 5 is a fragmentary schematicized sectional view, taken generally along the line 5—5 of FIG. 2, with the relationships between the passages modified to illustrate the relationship between the movable directional control valve and fixed valving surfaces, the directional control valve being shown in an initial or neutral position;

FIG. 6 is a fragmentary schematicized sectional view, generally similar to FIG. 5, illustrating the directional control valve in an actuated position;

FIG. 7 (on sheet 2 of the drawings) is a view taken generally along the line 7—7 of FIG. 2 and illustrates the construction of a switch assembly which is actuated upon movement of the directional control valve from the initial position shown in FIG. 5;

DESCRIPTION OF SPECIFIC PREFERRED EMBODIMENTS OF THE INVENTION

GENERAL DESCRIPTION

Figure 1:
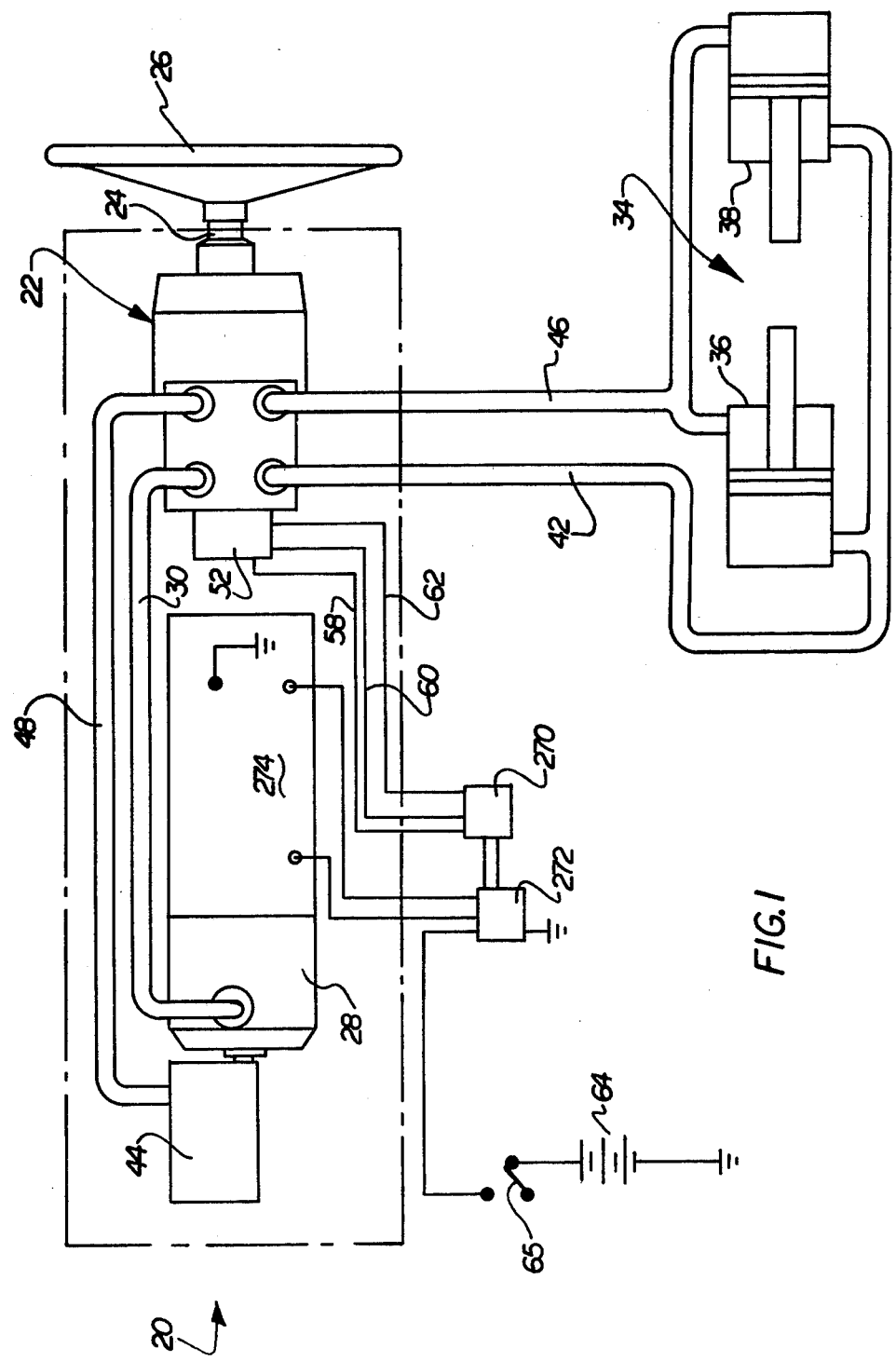
FIG. 1 is a schematic illustration of a steering system having a control unit which actuates a switch assembly to effect operation of an electric motor to increase fluid flow from a pump upon initiation of a steering operation.

A steering control system 20 constructed in accordance with the present invention includes a steering control unit 22 (see FIG. 1) having a rotatable input shaft 24 which is connected with a manually rotatable steering wheel 26. The steering control unit 22 is supplied with power steering fluid by a pump 28 through a supply conduit 30. The steering control unit 22 is connected in fluid communication with a power steering motor assembly 34 having a pair of motor cylinder assemblies 36 and 38 which are connected with steerable vehicle wheels.

Upon rotation of the steering wheel 26 to effect turning movement of the steerable vehicle wheels toward the right, the steering control unit 22 ports pressurized fluid to a conduit 42 connected with the head end of the motor cylinder assembly 36 and the rod end of the motor cylinder assembly 38. The rod end of the motor cylinder assembly 36 and head end of the motor cylinder assembly 38 are connected with a reservoir 44 through conduit 46, the steering control unit 22, and a conduit 48. Fluid conducted from the pump 28 to the power steering motor assembly 34 effects turning movement of the steerable vehicle wheels toward the right in a known manner.

Similarly, upon rotation of the steering wheel 26 to effect a left turn, fluid from the pump 28 is ported to the conduit 46 which is connected with the rod end of the motor cylinder assembly 36 and head end of the motor cylinder assembly 38. The head end of the motor cylinder assembly 36 and the rod end of the motor cylinder assembly 38 are connected with the fluid return conduit 48 through the conduit 42 and the steering control unit 22.

In accordance with a feature of the present invention, actuation of the steering control unit 22 by rotation of the steering wheel 26 effects actuation of a switch assembly 52 to initiate a control function. Specifically, upon initial rotation of the steering wheel 26, a directional control valve 54 (FIG. 2) in the steering control unit 22 is moved in response to rotation of the input shaft 24. Movement of the directional control valve 54 from its initial or neutral position ports pressurized fluid to the power steering motor assembly 34 to turn the steerable vehicle wheels in a desired direction. In addition, movement of the directional control valve 54 (FIG. 2) from its initial or neutral position to its actuated position is effective to actuate the switch assembly 52. Upon actuation of the switch assembly 52, a power supply lead 58 is connected with a lead 60 or 62 to provide an output signal which effects a suitable control function. The lead 58 is energized by a battery 64 (FIG. 1) through an ignition or main switch 65.

The switch assembly 52 is actuated under the influence of forces transmitted directly from the valve member 54 (FIG. 2) to the switch assembly. Thus, the switch assembly 52 includes an actuator shaft 66 which is connected with the directional control valve 54 by a connector 68. The connector 68 transmits rotary movement of the directional control valve 54 to the actuator shaft 66 to actuate the switch assembly 52 upon initiation of the steering operation. Although an on-off type switch assembly 52 has been illustrated in the drawings, other types of switches could be used if desired. For example, a potentiometer type switch or a magnetic field responsive switch could be used if desired.

STEERING CONTROL UNIT

The steering control unit 22 includes a fluid metering unit 72 (FIG. 2) which meters a flow of fluid to the power steering motor assembly 34 (FIG. 1) upon rotation of the input shaft 24. The fluid metering unit 72 is of the gerotor gear type and includes an internally toothed gear 74 (FIG. 3). The gear 74 is connected with the input shaft 24 (FIG. 2) to rotate with the shaft about an axis which is coincident with the central axis of the control valve 54 and the input shaft 24. An externally toothed gear or star 76 (FIG. 3) is circumscribed by the internally toothed gear 74. The externally toothed gear 76 has one less tooth than the internally toothed gear 74. The internally and externally toothed gears 74 and 76 define a variable volume fluid receiving pockets 78, 80, 82, 84, 86 and 88.

Upon rotation of the input shaft 24, the internally toothed gear 74 rotates about the same axis as the input shaft 24 and valve member 54. Initial rotation of the internally toothed gear 74 causes the externally toothed gear 76 to rotate about its own central axis and to orbit about the central axis of the internally toothed gear 74. The initial rotational movement of the externally threaded gear 76 is transmitted through a wobble shaft or link 92 (FIG. 2) to one component 102 of a commutator valve assembly 94 which is connected to a right (as viewed in FIG. 2) end portion 98 of the directional control valve 54 by a key or other suitable mechanical connector 100. The wobble shaft 92 has a central axis which is skewed relative to the common central axis of the directional control valve 54, outer gear 74 and input shaft 24.

After the externally toothed gerotor gear or star 76 and directional control valve 54 have rotated together through a relatively small arcuate distance, a commutator valve component 102 prevents further rotation of the externally toothed gear. Thus, the left (as viewed in FIG. 2) end portion of the commutator valve 102 has a pair of projections 103 and 104 (FIG. 4) which are received in recesses 105 and 106 (see FIG. 4) formed in a stationary main section 110 (FIG. 2) of a control unit housing 112. Upon counterclockwise (as viewed in FIGS. 4 and 5) rotation of the commutator valve 102 and directional control valve 54 about their common central axis through an arcuate distance indicated at 111 in FIG. 4, side surfaces of the projections 103 and 104 on the commutator valve 102 engage surfaces of the housing section 110 to limit rotational movement of the directional control valve 54. If the input shaft 24 is rotated in the opposite direction, the directional control valve 54 and commutator valve 102 will be rotated in a clockwise direction (as viewed in FIGS. 4 and 5) through an arcuate distance indicated at 114 in FIG. 4. After the commutator valve 102 has rotated from the initial position illustrated in FIG. 4 through the arcuate distance 111 or 114, the stationary housing section 110 blocks further rotation of the commutator valve and the directional control valve 54 about their common central axis.

After the externally toothed gear 76 and directional control valve 54 have been rotated about their respective axes through an arcuate distance sufficient to move the directional control valve from an initial or neutral position to an actuated position, the commutator valve 102 holds the externally toothed gear 76 against rotation about its own axis. The externally toothed gear or star 76 (see FIG. 3) can then only orbit about the central axis of the internally toothed gear 74 as the internally toothed gear is rotated by the input shaft 24. Thus, after the directional control valve 54 has been rotated to an actuated position, continued rotation of the input shaft 24 results in rotation of the internally toothed gear 74 and orbital movement of the externally toothed gear 76. Orbital movement of the externally toothed gear 76 results in the wobble shaft 92 pivoting about its end portion which is connected with the commutator valve assembly 94, while being held against rotational movement about its own central axis by the stationary commutator valve 102.

As the externally toothed gear or star 76 is orbiting about the central axis of the rotating internally toothed gear 74 (FIG. 3), the pockets 78, 80, 82, 84, 86 and 88 are expanded and contracted. Fluid is directed from the directional control valve 54 to the expanding pockets by the commutator valve assembly 94. The commutator valve assembly 94 also directs fluid from the contracting pockets back to the directional control valve 54. This meters a flow of fluid through the directional control valve 54 to the power steering motor assembly 34.

When the input shaft 24 stops rotating, the internally toothed gear 74 stops rotating about its central axis. The directional control valve 54 is then returned to its initial position by a torsion type biasing spring 118 disposed within the directional control valve 54. A right (as viewed in FIG. 2) end 120 of the biasing spring 118 is fixedly connected with the right end portion 98 of the directional control valve 54. The left (as viewed in FIG. 2) end 122 of the biasing spring 118 is fixedly connected with a secondary section 124 of the control unit housing 112. The torsion spring 118 may be constructed in the manner shown in U.S. Pat. No. 3,918,856.

Rotation of the directional control valve 54 in a clockwise or counterclockwise direction from its initial position stresses the torsion spring 118. When the input shaft 24 stops rotating, potential energy stored in the spring 118 causes the directional control valve 54 to rotate back to its initial or neutral position. This rotational movement of the directional control valve 54 is transmitted by the wobble shaft 92 to the externally toothed gear 76 which, at that time, both orbits and rotates relative to the stationary internally toothed gear 74.

The directional control valve 54 is provided with a plurality of longitudinally extending slots or grooves which cooperate with radially extending passages formed in a stationary valve section 108 (see FIGS. 5 and 6). The radially extending passages formed in the stationary valve section 108 are connected with the fluid metering unit 72 (FIG. 2), the conduit 30 leading to the pump 28 (FIG. 1), the conduit 48 leading to the reservoir 44, and the conduits 42 and 46 leading to the power steering motor assembly 34. Rotation of the directional control valve 54 from its initial position to an actuated position connects various combinations of these passages to effect turning movement of the steerable vehicle wheels.

The stationary valve section 108 has four radially extending passages 128, 130, 132 and 134 (FIG. 5) which are connected to the reservoir or outlet conduit 48. The stationary valve section 108 also has four radially extending passages 138, 140, 142 and 144 which are connected to the pump 28 through the inlet conduit 30. A pair of radially extending passages 148 and 150 are connected with the fluid metering unit 74. Another pair of radially extending passages 156 and 158 are connected to a conduit 46 leading to the power steering motor assembly 34. Another pair of radially extending passages 159 and 160 are connected to the conduit 42 which leads to the power steering motor assembly 34.

When the directional control valve 54 is in the initial or neutral position shown in FIG. 5, fluid flow through the inlet passages 138, 140, 142 and 144 is restricted by lands 164, 166, 168 and 170 formed on the directional control valve member 54. Fluid flows from the inlet ports or passages 138, 140, 142 and 144 around the lands 164, 166, 168 and 170 to the outlet ports or passages 128 and 132 in the manner indicated schematically by the arrows in FIG. 5. Therefore there is a continuous flow of fluid from the pump 28 through the inlet ports 138, 140, 142 and 144 to reservoir 44 through the radially extending passages 128 and 132 in the stationary valve part 108 when the directional control valve 154 is in the initial or neutral position.

When the directional control valve 54 is in the neutral position illustrated in FIG. 5, the two conduits 42 and 46 for conducting fluid to the motor cylinder assemblies 36 and 38 are interconnected through the metering unit 72. This results in forces exerted against the steerable vehicle wheels being transmitted through the gerotor gears 74 and 76 in the fluid metering unit 72 to the input shaft 24 which is connected with the steering wheel 26. Thus, when the directional control 54 is in a neutral position, the ports 156 and 158 connected with the conduit 46 are in fluid communication with the ports 148 and 150 which are connected by internal passages to the fluid metering unit 72. Similarly, the ports 159 and 160 are connected with the metering unit 72 through a passage 189 extending through the center of the directional control valve 54 (see FIGS. 2 and 5).

Upon rotation of the steering wheel 26 to turn the steerable vehicle wheels toward the right, the directional control valve 54 is rotated in a counterclockwise direction (as viewed in FIG. 5) from the neutral or initial position to the actuated position illustrated in FIG. 6. The conduit 42 (FIG. 1) leading to the head end of the motor cylinder assembly 36 and the rod end of the motor cylinder assembly 38 is connected with the pump 28 through the directional control valve 54, metering unit 72, and conduit 30. The conduit 46 leading to the rod end of the motor cylinder assembly 36 and the head end of the motor cylinder assembly 38 is connected with the reservoir 44 through the directional control valve 54 and conduit 48.

When the directional control valve 54 is in an actuated position to effect a right turn, the inlet ports 138 and 142 in the stationary valve member 108 connect the pump 28 in fluid communication with the metering ports 148 and 150 which are connected in fluid communication with the metering unit 72. A metered flow of fluid is directed by the commutator valve 94 from the metering unit 72 to the central passage 189 in the directional control valve 54. The metered flow of fluid is conducted from the central passage 189 to the ports 159 and 160 (see FIG. 6) which are connected with the conduit 42.

The increased fluid pressure in the motor cylinder assemblies 36 and 38 effects operation of the power steering motor assembly 34 to turn the steerable vehicle wheels. As the motor assembly 34 is being actuated by a metered flow of high pressure fluid through the conduit 42 during a right turn, fluid is exhausted from the motor cylinder assemblies 36 and 38 to the conduit 46. The conduit 46 is connected in fluid communication with the radial passages 156 and 158 in the stationary valve part 108. Passages 156 and 158 are connected with the outlet passages 130 and 134 through which fluid is conducted to the conduit 48 leading the reservoir 44.

When the right turn has been completed, the torsion spring 118 rotates the directional control valve from the actuated position shown in FIG. 6 back to the neutral position shown in FIG. 5. Fluid flow is established from the inlet conduit 30 (see FIG. 1) to the return or drain conduit 48. The two motor cylinder assemblies 36 and 38 are connected in fluid communication through the fluid metering unit 72.

Upon initiation of a left turn, the directional control valve is rotated in a clockwise direction from the initial position shown in FIG. 5. A metered flow of fluid is conducted from the inlet conduit 30 through the metering unit 72 to the conduit 46 leading to the rod end of the motor cylinder assembly 36 and head end of the motor cylinder assembly 38. Thus, inlet fluid from the ports 140 and 144 is conducted to the metering unit 72 through the central passage 190 in the directional control valve 54. The output from the metering unit is conducted to the radially extending passages 148 and 150 which are now connected with the passages 156 and 158 which lead to the conduit 46 and power steering motor assembly 34.

During a left turn, fluid exhausted from the power steering motor assembly 34 is conducted from the conduit 42 to the passages 159 and 160 in the stationary valve part 108. The fluid exhausted from the power steering motor assembly is conducted from the passages 159 and 160 to the outlet passages 130 and 134. At the end of the left turn, the directional control valve 54 is returned to its initial position by the biasing spring 118.

Although the directional control valve 54 has been shown in FIG. 6 in a fully actuated condition, it should be understood that the directional control valve may only be rotated through a portion of the arcuate distance indicated at 111 in FIG. 4. Similarly, when a left turn is made, the directional control valve may be rotated through only a portion of the arcuate distance indicated at 114 in FIG. 4. The arcuate distance through which the directional control valve 54 is rotated in a steering operation varies as a function of the torque applied to the input shaft 24. This results in the operator encountering a resistance to rotational movement of the steering wheel which varies as a function of the extent to which the directional control valve 54 is rotated.

The construction of the directional control valve 54, commutator valve 94, and fluid metering unit 72 and the manner in which they interact during a steering operation is generally the same as is described in U.S. Pat. No. 3,895,888 and will not be further described herein. Although it is preferred to use a steering control unit 22 having the construction shown herein, other types of steering control units could be used if desired. For example, the directional control valve 54 could be moved axially rather than being rotated about its central axis upon initiation and termination of a steering operation. Although a particular type of biasing spring 118 has been disclosed herein, other types of biasing springs could be used to urge the directional control valve 54 to the neutral position.

SWITCH ASSEMBLY

Upon initiation of a steering operation, the switch assembly 52 is actuated to provide an output signal. Actuating motion is transmitted through the switch actuator shaft 66 (FIGS. 2 and 8), which is connected at one end with the directional control valve 54 for rotation therewith about the common central axis of the directional control valve 54, internally toothed gear 74, and input shaft 24. The other end of the switch actuator shaft 66 is connected with a movable contact arm 190 (FIG. 7). One end of the contact arm 190 is fixed to the switch actuator shaft 66 and the lead 58 by a screw 192. The opposite end of the contact arm 190 is provided with a circular contact section 194 (FIG. 7) projects toward an electrically insulating base 192 and is electrically connected with the lead 58 through the contact arm 190.

When the directional control valve 54 is in the neutral position illustrated in FIG. 5, the contact section 194 is disposed in abutting engagement with an electrically insulating base 198 of the switch assembly 52. The lead 58 thus is not electrically connected with the leads 60 or 62. Although a particular type of switch has been described herein, it is contemplated that other types of switching devices could be used. For example, a switch which is a proportional type position transducer could be used.

Upon initiation of a right turn, the steering control valve 54 is rotated in a counterclockwise direction (as viewed in FIG. 5) from the initial position. This rotation is transmitted to the contact arm 190 through the connector 68 and actuator shaft 66 (see FIG. 8) to move the contact section 194 into engagement with a stationary contact 202 (see FIG. 7). Upon engagement of the contact section 194 with the stationary contact 202, an electrical connection is completed between the lead 58 and the lead 62 to provide an output signal which indicates that a right turn has been undertaken.

Similarly, upon initiation of a left turn, the directional control valve 54 is rotated in a clockwise direction from the position shown in FIG. 5. This rotation of the directional control valve is transmitted to the contact arm 190 by the connector 68 and switch actuator shaft 66. The rotation of the contact arm 190 moves the contact section 194 into engagement with the stationary contact 204 to complete an electrical connection between the lead 58 and the lead 60 to provide an indication that a left turn has been undertaken.

When the directional control valve 54 is in the initial or neutral position illustrated in FIG. 5, the contact section 194 is disposed between the two fixed contacts 202 and 204 and does not engage either of the contacts. Therefore an electrical connection is not made between the lead 58 and either of the other two leads 60 or 62. However, the contact section 194 is spaced from the two fixed contacts 202 and 204 by only a small distance when the contact section is in the centered or initial position of FIG. 7.

The slightest movement of the directional control valve 54 away from the initial position causes the contact section 194 to engage either one of the two fixed contacts 202 and 204. This enables the switch assembly 52 to provide an output signal immediately upon initiation of a steering operation, that is after a small increment of movement of the directional control valve 54 and before the directional control valve has moved from the initial position of FIG. 5 to an actuated position. Therefore the output signal from the switch assembly 52 can be used to initiate a control function before the control valve 54 reaches an actuated position in response to rotation of the steering wheel 26.

The connector 68 (FIGS. 2 and 8) between the directional control valve 54 and the switch actuator shaft 66 provides a torsionally rigid coupling which is effective to transfer rotational movement of the directional control valve to the switch actuator shaft with a minimum of deflection. However the connector 68 is axially deflectable to accommodate variations in the axial positions of the switch actuator shaft 66 and the directional control valve 54.

The connector 68 is formed by single U-shaped leaf spring. One end portion 208 (FIG. 8) of the leaf spring 68 has an interference fit with the sides of an opening in the end portion of the directional control valve 54. A central portion 210 of the leaf spring is fixedly clamped against an arcuate end surface 212 of the switch actuator shaft 66 by a plate 214. The opposite end 218 of the connector 68 has an interference fit with the sides of a second opening in the end portion of the directional control valve 54.

The connector 68 has a pair of legs 222 and 224 which extend through openings 226 and 228 (FIG. 8) formed in an end wall 230 of the switch assembly housing 124. The openings 224 and 226 are large enough to accommodate rotation of the legs 222 and 224 of the connector spring 68 through an arcuate distance which is slightly greater than the maximum arcuate distance through which the directional control valve 54 can be rotated, that is through an arcuate distance which is greater than the combined distances indicated at 111 and 114 in FIG. 4. Therefore, the directional control valve 54 can be rotated throughout its range of movement without interference of the connector spring legs 222 and 224 with the switch assembly housing 124.

The leaf spring connector 68 is effective to transmit rotational movement of the directional control valve 54 to the switch actuator shaft 66 with almost no deflection and/or lost motion between the directional control valve 54 and the switch actuator shaft. This results in the movable contact section 194 (FIG. 7) being moved by the contact arm 190 under the influence of forces transmitted to the contact arm from the directional control valve 54 immediately upon initiation of rotation of the directional control valve. Deflection of the connector spring 68 upon initiation of rotation of the directional control valve 54 is minimized by mounting the actuator shaft 66 on a pair of bearing assemblies 232 and 234 (FIG. 8) and by forming the insulating base 198 of the switch assembly of a low friction material. This mounting arrangement allows the actuator shaft 66 to rotate with a minimum of friction between the actuator shaft and a cylindrical central opening 236 formed in the base member 198.

In accordance with a feature of the invention, the frictional forces retarding rotation of the switch actuator shaft 66 by the directional control valve 54 are further minimized by an absence of seals around the switch actuator shaft 66. Thus, a main chamber 242 (FIG. 2) in the main housing section 110 is in fluid communication with a chamber 244 in the switch housing section 124. Both chambers 242 and 244 of the control unit housing 112 are filled with the fluid which is directed to the power steering motor assembly 34. If a seal was provided between the two housing sections 110 and 124, the seal would have to engage the switch actuator shaft 66 and/or the connector 68. The presence of such a seal would impede rotation of the switch actuator shaft 66.

INITIAL POSITION ADJUSTMENT OF DIRECTIONAL CONTROL VALVE

When the directional control valve 54 is in the neutral position shown in FIG. 5, the lands on the directional control valve must be accurately aligned with the passages in the stationary valve section 108 to permit fluid to flow from the inlet passages 144, 138, 140 and 142 to the outlet passages 128 and 132. In addition, the motor cylinder assemblies 36 and 38 are connected in fluid communication by fluid flow through passages 148, 156, 159, 150, 158 and 160 in the stationary valve section 108 and around lands on the directional control valve 54. If the initial position to which the directional control valve 54 is returned by the biasing spring 118 is not correctly located relative to the stationary valve section 108, the desired fluid flows around the lands in the directional control valve and through the passages of the stationary valve section 108 will not be obtained when the steering control assembly is in a neutral condition.

In accordance with one of the features of the invention, the initial position of the directional control valve 54 can be easily adjusted. To adjust the initial position of the directional control valve 54, a connector 250 (see FIGS. 2 and 8) between the main housing section 110 and the secondary or switch housing section 124 is released. The switch housing section 124 is then rotated through a small arcuate distance relative to the main housing section 110 to adjust the position of the directional control valve 54 relative to the stationary valve section 108. During rotational movement of the directional control valve 54 to adjust its initial position, the angular relationship between the components of the switch assembly 52 and the directional control valve remains constant. Therefore, the contact arm 190 is not moved relative to the stationary contacts 202 and 204.

Although many different types of connectors 250 could be used if desired, in the illustrated embodiment of the invention, the connector 250 includes a lock nut 254 (see FIG. 8) which is received on a threaded section 256 of the secondary housing section 124. After the nut 254 has been loosened, the secondary housing section 124 can be rotated about its central axis and about the central axis of the directional control valve 54.

Because the secondary housing section 124 screws into the main housing section 110, rotation of the secondary housing section to adjust the initial position of the directional control valve may cause a slight axial movement of the secondary housing section relative to the main housing section depending on the direction of rotation. The axial movement is accommodated by deflection of the central section 210 of the connector spring 68 about the arcuate end surface 212 on the switch actuator shaft 66. After the directional control valve 54 has been moved to the desired initial position, the nut 254 is tightened to lock the secondary housing section 124 against rotational movement relative to the main housing section 110.

Rotational movement of the secondary housing section 124 relative to the housing main section 110 to adjust the initial position of the directional control valve 54 is transmitted to the directional control valve through the biasing spring 118. Thus, the left (FIGS. 2 and 8) end portion 122 of the biasing spring 118 is fixedly connected to the end section 230 of the secondary housing section 124. The right (FIG. 2) end portion of the biasing spring 118 is fixedly connected to the directional control valve 54.

Rotation of the secondary housing section 124 rotates the relatively stiff torsional spring 118 about its central axis. Since the end 120 (see FIG. 2) of the biasing spring 118 is fixed to the directional control valve 54, rotation of the biasing spring rotates the directional control valve 54 about its central axis. Rotational of the directional control valve 54 results in a corresponding rotation of the commutator valve 94 and the externally toothed gear 76. It should be understood that the directional control valve 54 will probably be rotated through only a small arcuate distance to adjust the initial position of the valve.

As the directional control valve 54 is rotated about its central axis relative to the stationary valve section 108 by rotation of the switch housing section 124, the connector 68 between the directional control valve 54 and the switch actuator shaft 66 rotates the switch actuator shaft through the same arcuate distance as the switch housing section. Therefore, the position of the movable contact section 194 relative to the two fixed contact sections 202 and 204 does not change as the initial position of the directional control valve 54 is adjusted. Both the switch assembly 52 and the directional control valve 54 remain in their initial angular positions relative to each other when the nut 254 is tightened to lock the secondary housing section 124 against rotation relative to the main housing section 110.

CONTROL FUNCTION-PUMP OUTPUT

Many different control functions could be undertaken in response to actuation of the switch assembly 52. However in the embodiment of the invention illustrated in FIG. 1, the output of the pump 28 is increased upon initiation of a steering operation. Prior to initiation of the steering operation, the pump 28 is not driven in order to minimize the load an operating components of the vehicle. Accordingly, no fluid flows between the steering control unit 22 and the pump 28.

Upon initiation of a steering operation, actuation of the switch assembly 52 transmits a control signal to a delay circuit 270 which immediately effects actuation of a relay 272 to energize an electric motor 274 which drives the pump 28. Upon energization of the motor 274, the fluid output from the pump 28 is quickly increased to supply the demand for steering fluid by the control unit 22. Since the electric motor 274 is not energized until a steering operation is undertaken, there is no unnecessary drain on the vehicle battery. Upon completion of a steering operation, the switch assembly 52 is returned to its unactuated condition and the motor 274 is subsequently de-energized to minimize the drain on the vehicle battery.

During steering of the vehicle a left turn may be undertaken and then, immediately thereafter, a right turn. In order to prevent stopping and starting of the electric motor 274 and pump 28 under these conditions, the time delay circuit 270 maintains the relay 272 energized for a short time period after the switch assembly 52 is returned to its initial or unactuated condition (FIG. 7). Thus, the time delay circuit 270 causes the electric motor 274 to be maintained in an energized condition to drive the pump 28 during a rapid sequence of steering operations.

In the illustrated embodiment of the invention, the electric motor 274 is de-energized to minimize the drain on the vehicle battery when the switch assembly 52 is returned to its initial condition at the end of a steering operation. However, it may be desirable to operate the electric motor 274 at a relatively low speed to provide a minimum standby flow from the pump 28. Upon actuation of the switch assembly 52, the speed of the motor 274 would be increased to increase the rate of flow of fluid from the pump 28. A suitable accumulator might also be provided in association with the pump 28 if desired.

The movable contact section 194 is moved into engagement with either the right turn stationary contact 202 or the left turn stationary contact 204 immediately upon the first small increment of movement of the directional control valve 54. Therefore, the switch assembly 52 is immediately actuated upon initiation of a steering operation. This enables the pump 28 to be brought up to the desired operating speed to supply an anticipated demand for power steering fluid.

Although the electric motor 274 has been illustrated in FIG. 1 as driving a fixed displacement pump 28, the electric motor could be associated with a variable displacement pump. With a variable displacement pump, actuation of the switch assembly 52 would cause the electric motor 274 to operate a suitable control mechanism to increase the displacement of the pump 28 from a minimum displacement to a normal operating displacement. The variable displacement pump would, itself, be driven from the main vehicle engine or by a second electric motor.

The switch assembly 52 has been described herein as an on-off type switch which is actuated to increase the speed of the motor 274 to a predetermined speed. However if a range of motor speeds is desired, a step type switch assembly can be used to provide an output which varies as a function of variations in the torque applied to the input shaft 24. Thus when the torque applied to the input shaft is increased, the arcuate distance through which the directional control valve 54, actuator shaft 66, and contact arm 190 are rotated is increased. The switch assembly 52 can be constructed to have an output voltage which varies as a function of the arcuate distance through which the actuator shaft 66 and the contact arm 190 are rotated. The operating speed of the motor 274 would be varied as a function of variations in the output voltage from the switch assembly.

CONTROL FUNCTION-PRIORITY VALVE

Figure 8:
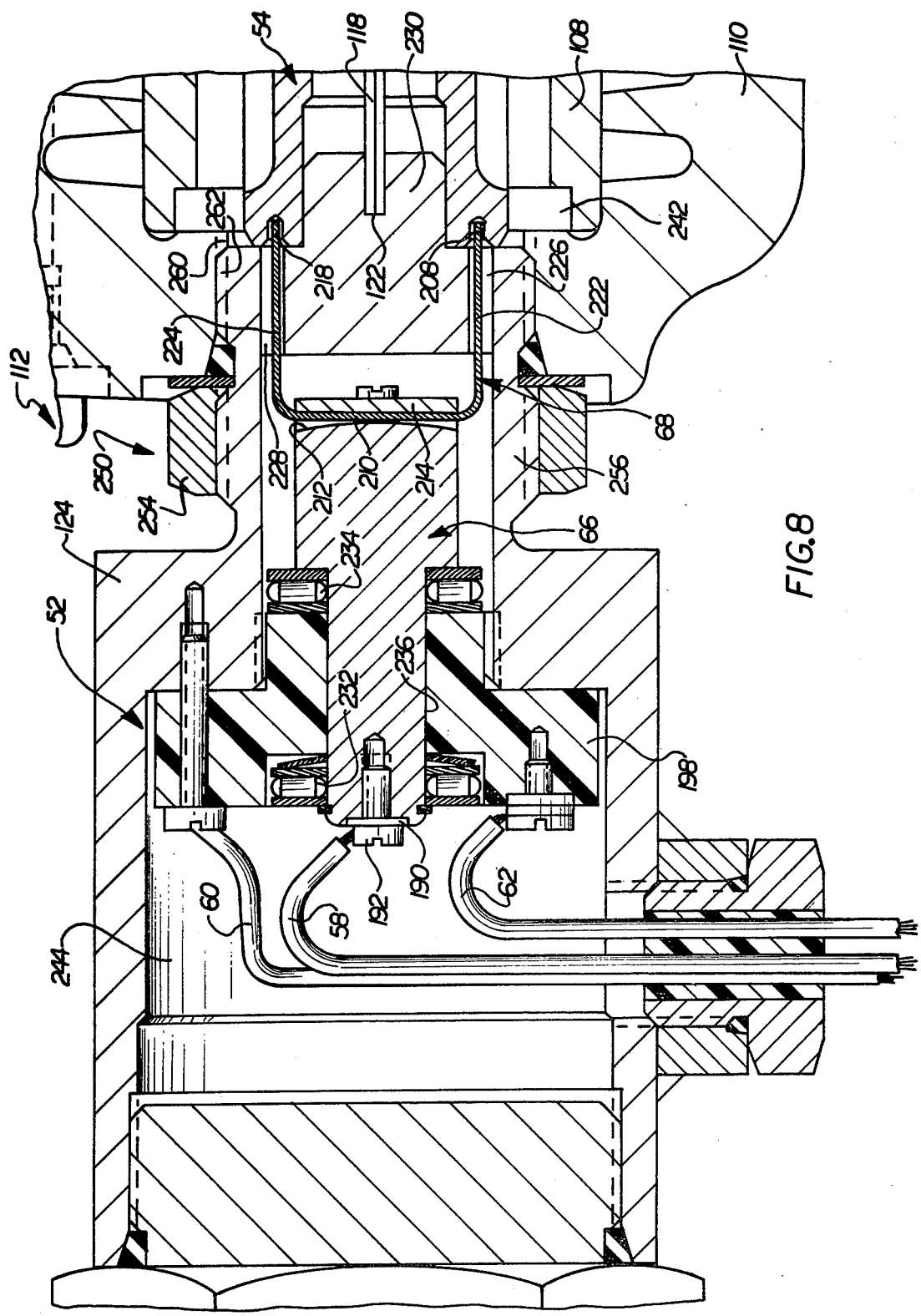
FIG. 8 is an enlarged sectional view further illustrating the construction of the switch assembly of FIGS. 2 and 7.
Figure 9:
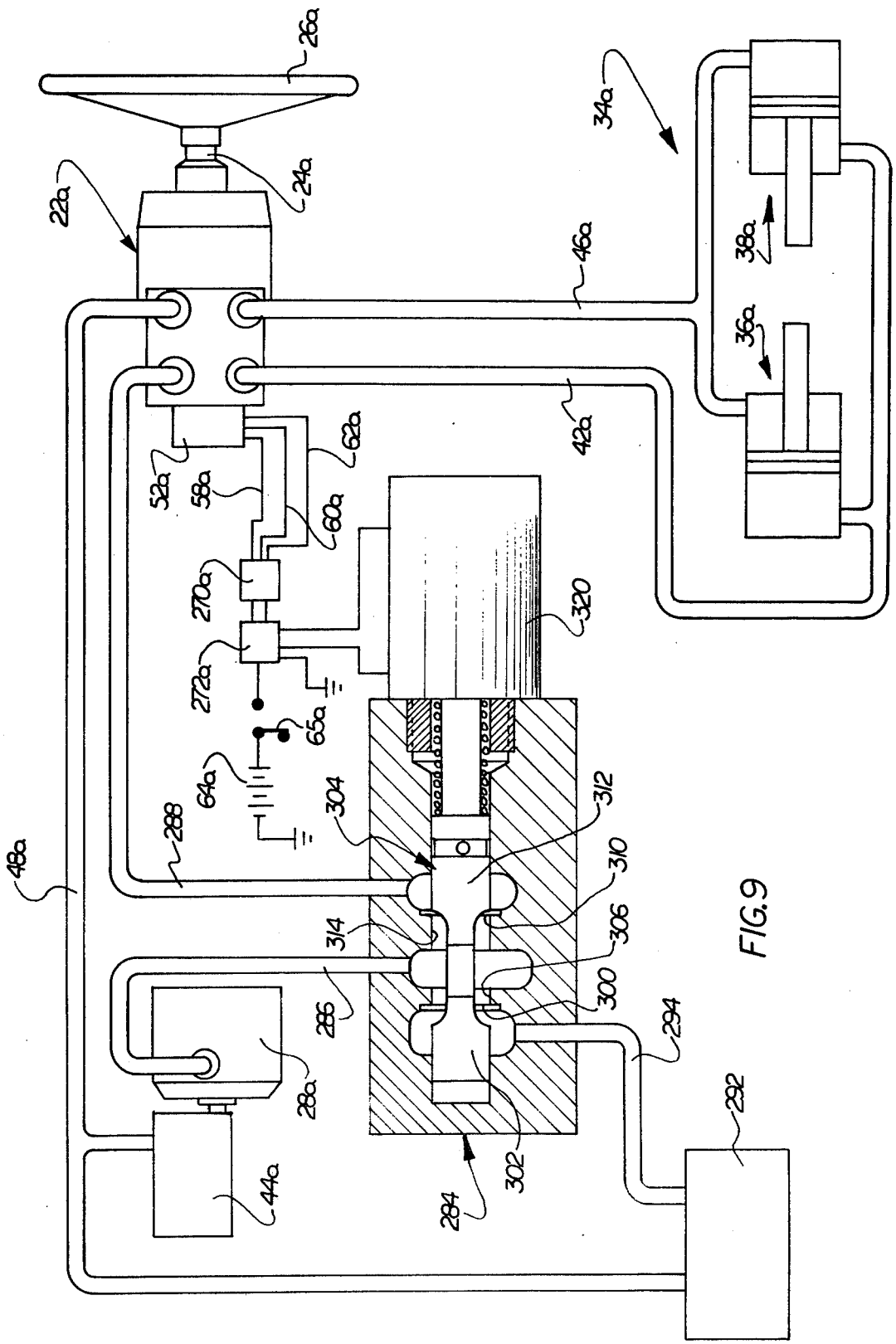
FIG. 9 is a schematic illustration, generally similar to FIG. 1, of a steering apparatus in which actuation of a steering control unit actuates a switch assembly to effect operation of a priority valve assembly to increase fluid flow to the steering control unit.

In the embodiment of the invention shown in FIG. 9, the control function which is effected in response to initiation of a vehicle steering operation is the actuation of a priority control valve. Since the components of the embodiment of the invention shown in FIG. 9 are generally similar to the components of the embodiment of the invention shown in FIGS. 1-8, similar reference numerals will be utilized to designate similar components, the suffix letter "a" being added to the numerals associated with the embodiment of FIG. 9 in order to avoid confusion.

A steering control unit 22a has an input shaft 24a which is connected with a vehicle steering wheel 26a. A motor driven pump 28a is connected with a priority valve assembly 284 by a conduit 286. The priority valve assembly 284 is connected in fluid communication with the steering control unit 22a by a conduit 288. The priority valve assembly 284 is also connected with an auxiliary apparatus 292 by conduit 294. The auxiliary apparatus 292 and the steering control unit 22a are connected with a reservoir 44a by a fluid return conduit 48a.

The steering control unit 22a is connected with a power steering motor assembly 34a by a pair of conduits 42a and 46a. The power steering motor assembly 34a includes a pair of motor cylinder assemblies 36a and 38a.

When the vehicle is being operated without turning the steerable vehicle wheels, that is in the absence of a steering operation, the priority valve assembly 284 directs most of the fluid from the pump 28a through a variable size orifice 300 to the auxiliary apparatus 292. The variable size orifice 300 is formed between a land 302 on a valve spool 304 and a stationary valve land 306. A relatively small or standby flow of fluid is conducted to the steering control assembly 22a through a variable size orifice 310 formed between a land 312 on the valve spool 304 and a stationary land 314. The standby flow of fluid is directed from the steering control assembly 22a back to the reservoir 44a though the conduit 48a.

Upon the initiation of a steering operation, the switch assembly 52a is actuated, in the same manner as previously explained in connection with the embodiment of the invention illustrated in FIGS. 1-8, to direct a signal to a time delay circuit 270a. The delay circuit 270a immediately transmits a signal to energize a relay 272a. The relay 272a is connected with a solenoid 320 which is energized to move the valve spool 304 to an actuated position.

The solenoid 30 can be of either the uni-directional or bi-directional type. The general construction and mode of operation of the solenoid 320 is well known and will not be further described herein as any suitable commercially available solenoid could be used to effect actuation of the valve spool 304.

Upon energization of the solenoid 320, the valve spool 304 is moved toward the right (as viewed in FIG. 9) to decrease the size of the orifice 300 and the rate at which fluid is supplied to the auxiliary apparatus 292. At the same time, the size of the orifice 310 is increased to increase the rate at which fluid is supplied to the steering control unit 22a through the conduit 288.

The switch assembly 52a is actuated immediately upon initiation of a steering control operation so that the priority valve assembly 284 is actuated during an initial portion of the steering operation to divert fluid flow from the auxiliary apparatus 292 to the steering control unit 22a. Thus, the switch 52a is actuated by an initial small increment of movement of the directional control valve in the power steering control unit 22a away from its initial or neutral position toward its actuated position. The switch assembly 52a is actuated before the directional control valve in the control unit reaches its actuated position to enable the priority valve 284 to be actuated in anticipation of a steering operation.

The time delay circuit 270a maintains the solenoid 320 energized for a predetermined time period after termination of a steering operation. This results in the priority valve 284 being maintained in an actuated condition directing fluid flow to the steering control unit 22a. Therefore, if the steering wheel is again turned during this relatively short time period, the priority valve is already actuated to direct fluid flow to the steering control unit 22a.

The solenoid 320 is of the two-position type which is energized by actuation of the switch assembly 52a to operate the priority valve 284 to an actuated condition. The priority valve spool 304 is spring biased back to the initial position shown in FIG. 9. However, the switch assembly 52a could be of the step or proportional voltage type and would then have an output voltage which increases as a function of the extent of actuation of the control unit 22a. With a step-type switch assembly 52a, the solenoid 320 would be of the proportional type having an armature which moves to an extent determined by the input current to the solenoid. Such a solenoid would move the valve spool 304 through a range of positions to vary the extent to which the sizes of the orifices 300 and 310 are varied as a function of the torque applied to the control unit input shaft 24a and the extent of operation of the switch assembly 52a.

SWITCH ASSEMBLY-SECOND EMBODIMENT

In the embodiment of the invention shown in FIGS. 1-8, the switch assembly 52 has a control arm 190 (FIG. 7) which is rotated about the central axis of the directional control valve 54 upon initiation of a steering operation. In the embodiment of the invention illustrated in FIGS. 10 and 11, the switch assembly includes a pair of limit switches, one of which is actuated upon initial rotation of a directional control valve. Since the embodiment of the invention illustrated in FIGS. 10 and 11 is generally similar to the embodiment of the invention illustrated in FIGS. 1-8, similar numerals will be used to designate similar components, the suffix letter "b" being associated with the embodiment of the invention shown in FIGS. 10 and 11 to avoid prolixity of description.

Figure 11:
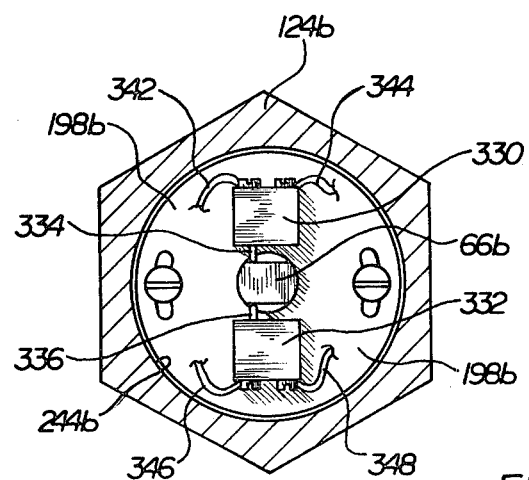
FIG. 11 is a view taken generally along the line 11—11 of FIG. 10 and further illustrating the construction of the switch assembly.

The embodiment of the invention shown in FIG. 11 includes a switch assembly 52b having a housing section 124b. The housing section 124b is connected with a main housing section 110b of the control unit housing 112b for a steering control unit. The steering control unit has the same construction as the steering control unit 22 of FIG. 2.

Figure 10:
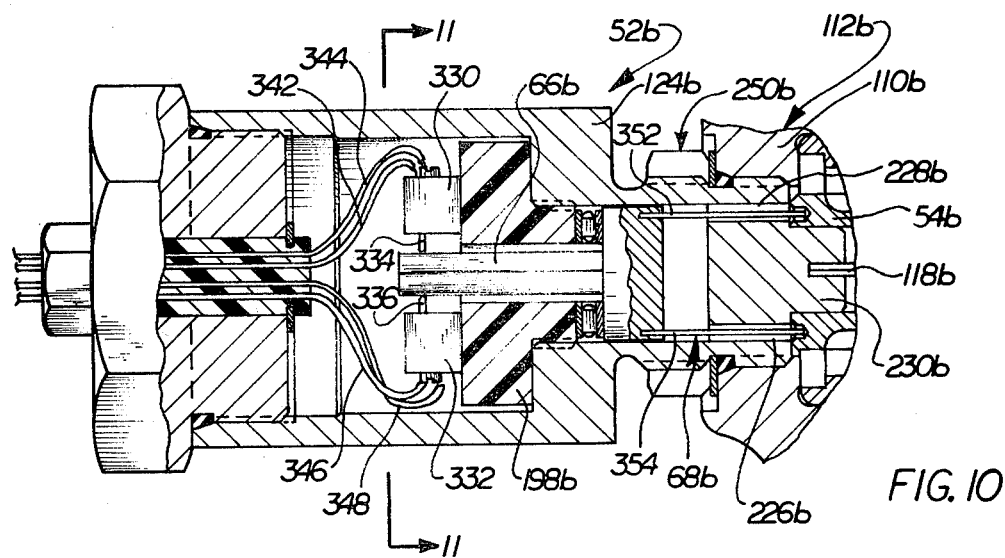
FIG. 10 is a fragmentary sectional view of a second embodiment of the switch assembly.

In accordance with a feature of the embodiment of the invention shown in FIGS. 10 and 11, the switch assembly 52b includes a pair of snap action limit switches 330 and 332. The limit switches 330 and 332 are mounted on a stationary base 198b. A switch actuator shaft 66b extends between plungers 334 and 336. The plungers 334 and 336 are moved axially to effect actuation of the limit switches 330 and 332.

Upon initiation of a steering operation, a directional control valve 54b (see FIG. 10) is rotated about its central axis. Rotation of the directional control valve 54b is transmitted through a connector 68b to the switch actuator shaft 66b. The resulting rotation of the switch actuator shaft 66b actuates one of the two limit switches 330 or 332 depending upon the direction in which the steerable vehicle wheels are to be turned. Since the limit switches 330 and 332 are of the snap action type, a very small movement of a plunger 334 or 336 is effective to actuate the switch.

If the steerable vehicle wheels are to be turned toward the left, the switch actuator shaft 66b is rotated in a clockwise direction (as viewed in FIG. 11) to actuate the limit switch 330. Similarly, if the steerable vehicle wheels are to be turned toward the right, the switch actuator shaft 66b is rotated in a counterclockwise direction (as viewed in FIG. 11) to actuate the limit switch 332. Actuation of the limit switch 330 completes a connection between leads 342 and 344 to provide an electrical signal to effect a control function upon initiation of a left turn. Similarly, actuation of the limit switch 332 completes a circuit between leads 346 and 348 to provide an electrical signal which effects a control function in response to initiation of a right turn.

Figure 2:
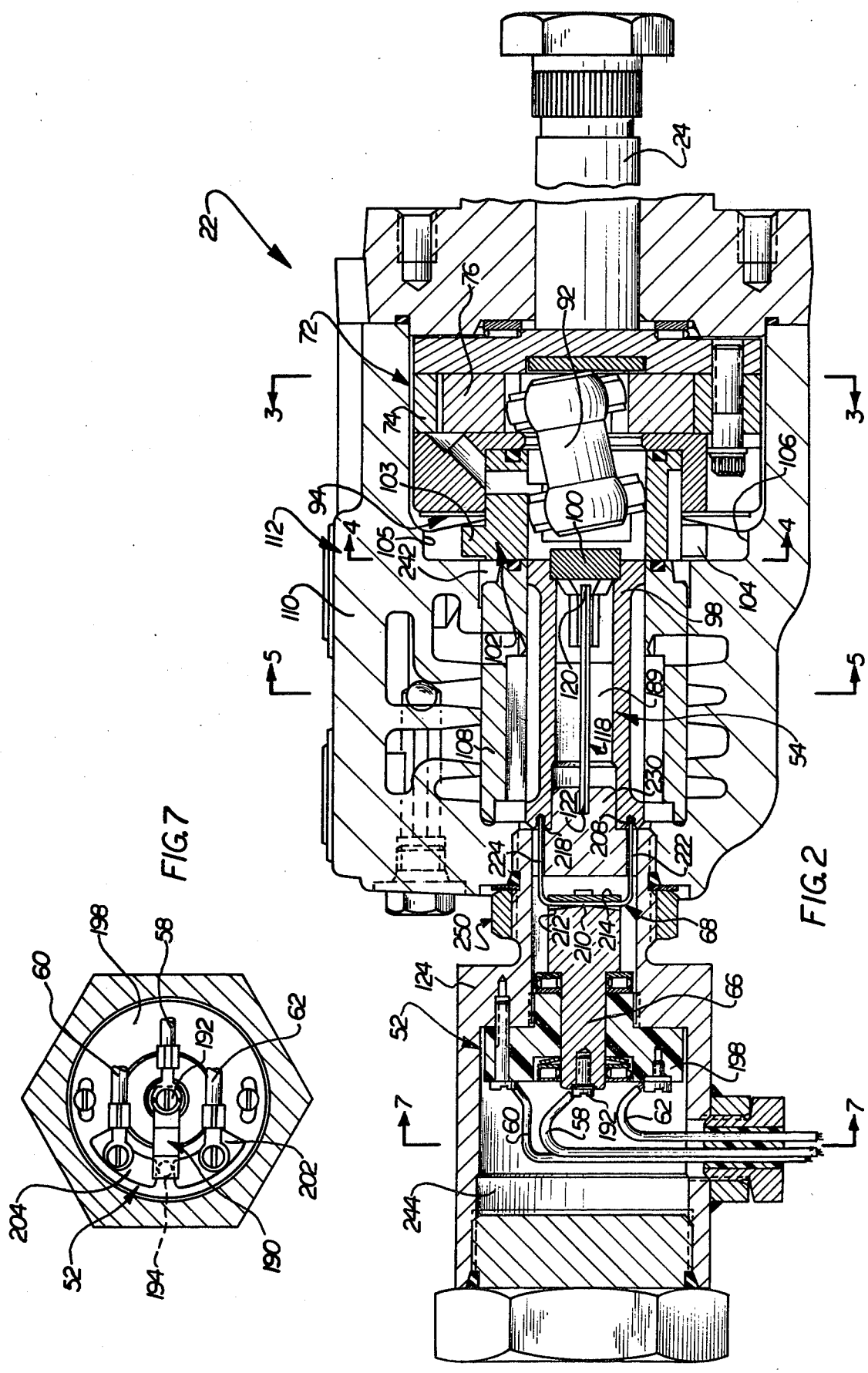
FIG. 2 is an enlarged sectional view of the control unit of FIG. 1 and illustrating the relationship between a directional control valve, switch assembly, and a coupling which interconnects the directional control valve and the switch assembly.

In the embodiment of the invention illustrated in FIGS. 2 and 8, the connector 68 has a generally U-shaped configuration to enable the connector to be resiliently deflected to accommodate axial displacement between the directional control valve 54 and the actuator shaft 66. In the embodiment of the invention shown in FIG. 10, the connector 68b includes a pair of straight rods 352 and 354 which extend through openings 226b and 228b in the end portion 230b of the switch housing section 124b. The straight connector rods 352 and 354 are effective to transmit rotational movement between the valve spool 54b and the actuator shaft 66b.

SUMMARY

The present invention provides a new and improved apparatus 20 for use in effecting operation of a fluid motor assembly 34 to turn steerable vehicle wheels. Initiation of a steering operation actuates a gerotor gear set 74, 76 to meter fluid flow to the motor assembly. Initial actuation of the gerotor gear set 74, 76 moves a directional control valve 54 from an initial position to either one of two actuated positions to effect turning movement of the vehicle wheels toward either the left or the right.

In accordance with a feature of the invention, a switch assembly 52 is provided to effect a control function in response to movement of the directional control valve 54 from the initial position. A switch actuator shaft 66 is connected with the directional control valve 54 and is moved under the influence of forces transmitted from the directional control valve. In one embodiment of the invention, actuation of the switch assembly 52 effects operation of an electric motor 274 to increase the fluid flow from a pump 28. In another embodiment of the invention, actuation of the switch assembly effects operation of a priority valve 284 to increase the rate at which fluid is directed to a steering control assembly.

Adjustment of the initial position of the directional control valve 54 is facilitated by providing a two-section housing 112 which encloses both the directional control valve 54 and the switch assembly 52. The section 124 of the housing in which the switch assembly 52 is located can be moved relative to the section 110 of the housing in which the directional control valve 54 is located. This movement shifts the directional control valve 54 to adjust its initial position. The two housing sections 110 and 124 are advantageously connected in fluid communication with each other to eliminate the need for seals between the two housing sections. This enables the switch actuator 66 to be freely moved relative to the housing sections upon operation of the directional control valve 54.

Having described specific preferred embodiments of the invention, the following is claimed:

1. An apparatus for controlling a flow of fluid from a pump to a fluid motor assembly that is operable to turn steerable vehicle wheels, said apparatus comprising
   a housing adapted to be connected in fluid communication with the pump and the motor assembly,
   a gerotor gear set disposed in said housing and including relatively movable internally and externally toothed members,
   a valve member disposed in said housing and connected with one of said toothed members for movement relative to said housing under the influence of forces transmitted from said one toothed member to said valve member, said valve member being movable from an initial position to a first actuated position to port fluid from the pump to the motor assembly to effect operation of the motor assembly to turn the vehicle wheels in a first direction, said valve member being movable from the initial position to a second actuated position to port fluid from the pump to the motor assembly to effect operation of the motor assembly to turn the vehicle wheels in a second direction, and
   switch means for effecting a control function in response to movement of said valve member from the initial position, said switch means including a switch actuator connected to said valve member for movement therewith under the influence of forces transmitted from said valve member to said switch actuator upon movement of said one of said toothed members relative to said housing.

2. An apparatus as set forth in claim 1 wherein said switch means is operable from an initial condition to a first actuated condition to provide a control signal upon initiation of movement of said valve member from its initial position toward its first actuated position and prior to said valve member reaching its first actuated position, said switch means being operable from its initial condition to a second actuated condition to provide a control signal upon initiation of movement of said valve member from its initial position toward its second actuated position and prior to said valve member reaching its second actuated position.

3. An apparatus as set forth in claim 1 wherein said one of said toothed members is said externally toothed member, said valve member being connected to said externally toothed member for movement therewith relative to said housing.

4. An apparatus as set forth in claim 1 wherein said valve member has a central axis which is coincident with the central axis of the other of said toothed members, said valve member being rotatable with said one of said toothed members about the central axis of said other of said toothed members between said initial and said first and second actuated positions.

5. An apparatus as set forth in claim 4 wherein said switch actuator is connected with said valve member for rotation therewith about the central axis of said other of said toothed members.

6. An apparatus as set forth in claim 1 wherein said housing includes surface means for defining a first chamber section in which said valve member is disposed and a second chamber section in which said switch means is disposed, said first and second chamber sections being connected in fluid communication.

7. An apparatus as set forth in claim 1 further including a stationary valve surface adjacent to said valve member, said valve member being rotatable relative to said stationary valve surface to adjust the initial position of said valve member, said switch means including a first contact which is moved by said switch actuator, a second contact which is engaged by said first contact, and means for transmitting forces between said first and second contacts, valve member and said switch actuator to maintain the angular relationship therebetween constant during relaive rotation between said valve member and said valve surface to adjust the initial position of said valve member.

8. An apparatus as set forth in claim 1 wherein said housing includes first and second sections which are movable relative to each other, said valve member being disposed in and rotatable relative to said first housing section and said switch means being disposed in said second housing section, said apparatus further comprising releasable connector means operable between a first condition in which said connector means holds said first and second housing sections against movement relative to each other and a second condition in which said connector means permits said first and second housing sections to rotate relative to each other, and force transmitting means for connecting said valve member with said switch means and for maintaining the angular relationship between said switch means, second housing section and valve member constant during relative rotation between said first and second housing sections.

9. An apparatus as set forth in claim 1 further including an input member which is rotatable about its central axis in response to rotation of a steering wheel during a steering operation, said input member being connected with the other one of said internally and externally toothed members in such a manner as to effect rotation of said other toothed member about its central axis upon rotation of said input member, said one toothed member being rotatable through an arcuate distance about its central axis in response to initial rotation of said other toothed member upon initiation of a steering operation, said valve member being movable in response to rotation of said one toothed member through said arcuate distance to move said switch actuator.

10. An apparatus as set forth in claim 9 wherein said valve member is connected to said one toothed member for rotation therewith through said arcuate distance upon initiation of a steering operation, said switch actuator being connected with said valve member for rotation therewith through said arcuate distance.

11. An apparatus as set forth in claim 1 wherein said valve member is rotatable about its central axis by said one toothed member, said apparatus further including connector means for connecting said switch actuator to said valve member for rotation therewith about the central axis of said valve member, said connector means preventing rotation of said valve member relative to said switch actuator and accommodating axial adjustment of the spacing between said switch actuator and valve member.

12. An apparatus as set forth in claim 1 wherein said switch means further includes a contact member, first and second spaced apart surface areas, and an intermediate surface area disposed between said first and second surface areas, said intermediate surface area being electrically insulated from said first and second surface areas, said contact member being disposed in engagement with said intermediate surface area when said valve member is in the initial position, said contact member being disposed in engagement with said first surface area when said valve member is in the first actuated position, said contact member being disposed in engagement with said second surface area when said valve member is in said second actuated position.

13. An apparatus as set forth in claim 12 wherein said contact member is engageable with said first surface area upon initiation of movement of said valve member from the initial position toward the first actuated position and prior to said valve member reaching the first actuated position to enable said switch means to effect initiation of the control function prior to movement of said valve member to the first actuated position, said contact member being engageable with said second surface area upon initiation of movement of said valve member from the initial position toward the second actuated position and prior to said valve member reaching the second actuated position to enable said switch means to effect initiation of the control function prior to movement of said valve member to the second actuated position.

14. An apparatus as set forth in claim 1 wherein said internally and externally toothed members cooperate to at least partially define pockets which expand and contract upon relative rotational and orbital movement between said toothed members, said apparatus further including commutator valve means connected with said valve member for directing fluid flow to said expanding pockets and from said contracting pockets, said valve member being effective to port fluid from the contracting pockets to the motor assembly when said valve member is in the first actuated position and when said valve member is in the second actuated position.

15. An apparatus as set forth in claim 14 wherein said valve member is connected with said one toothed member for rotation therewith upon the occurrence of rotational and orbital movement between said toothed members.

16. An apparatus for controlling a flow of fluid to a fluid motor assembly that is operable to turn steerable vehicle wheels under the influence of fluid supplied by a pump having an output which is varied by operation of an electric motor, said apparatus comprising a housing adapted to be connected in fluid communication with the pump and the motor assembly, a valve member disposed in said housing and movable relative to said housing from an initial position to a first actuated position to port fluid to effect operation of the motor assembly to turn the vehicle wheels in a first direction, said valve member being movable relative to said housing from the initial position to a second actuated position to port fluid to effect operation of the motor assembly to turn the vehicle wheels in a second direction, a gerotor gear set disposed in said housing and including relatively movable internally and externally toothed members which cooperate to at least partially define pockets which expand and contract upon relative rotational and orbital movement between said toothed members, said valve member being connected to one of said toothed members for movement relative to said housing between the initial and the first and second actuated positions under the influence of forces transmitted from said one toothed member to said valve member, said valve member being effective to port fluid from the contracting pockets to the motor assembly when said valve member is in the first actuated position and when said valve member is in the second actuated position, and switch means for effecting operation of the electric motor to increase the fluid flow from the pump in response to movement of said valve member from the initial position, said switch means including a switch actuator connected to said valve member for movement therewith under the influence of forces transmitted from said valve member to said switch actuator.

17. An apparatus as set forth in claim 16 wherein said one of said toothed members is rotatable relative to the other toothed member, said valve member being connected with said one toothed member for rotation therewith.

18. An apparatus as set forth in claim 16 further including wobble shaft means for connecting said valve member with said one toothed member such that said valve member rotates with said one toothed member upon rotation of said one toothed member about its central axis and such that said one toothed member can orbit relative to the other toothed member without moving said valve member.

19. An apparatus as set forth in claim 16 wherein said switch means further includes first and second spaced apart surface areas and an intermediate surface area disposed between said first and second surface areas, said intermediate surface area being electrically insulated from said first and second surface areas, said switch means further including a contact member which engages (a) said intermediate surface area when said valve member is in the initial position, (b) said first surface area when said valve member is in the first actuated position, and (c) said second surface area when said valve member is in said second actuated position.

20. An apparatus as set forth in claim 19 wherein said contact member engages said first surface area upon initiation of movement of said valve member from the initial position toward the first actuated position and prior to said valve member reaching the first actuated position to effect operation of the electric motor to increase the fluid flow from the pump after movement of said valve member away from the initial position and prior to said valve member reaching the first actuated position, said contact member engaging said second surface area upon initiation of movement of said valve member from the initial position toward the second actuated position and prior to said valve member reaching the second actuated position to effect operation of the electric motor to increase the fluid flow from the pump after movement of said valve member from the initial position and prior to said valve member reaching the second actuated position.

21. An apparatus as set forth in claim 16 wherein said switch means effects operation of the electric motor to decrease fluid flow from the pump in response to movement of said valve member from one of the actuated positions to the initial position, said apparatus further including time delay means for effecting operation of the motor to maintain the fluid flow from the pump until a predetermined time period has elapsed after movement of said valve member from one of the actuated positions to the initial position.

22. An apparatus as set forth in claim 16 wherein said housing includes a surface means defining a first chamber section in which said valve member is disposed and a second chamber section in which said switch means is disposed, said first and second chamber sections being connected in fluid communication.

23. An apparatus as set forth in claim 22 further including connector means extending between said chamber sections for connecting said switch actuator with said valve member, said connector means being movable relative to said housing with said valve member and being free of engagement with seals.

24. An apparatus as set forth in claim 16 further including a stationary valve surface disposed adjacent to said valve member, said valve member being rotatable relative to said stationary valve surface to adjust the initial position of said valve member, said switch means including fixed and movable contacts which are moved relative to each other by said switch actuator, and means for transmitting forces between said fixed and movable contacts, valve member and switch actuator to maintain the angular relationship therebetween constant during relative rotation between said valve member and said valve surface to adjust the initial position of said valve member.

25. An apparatus for controlling a flow of fluid from a pump to a fluid motor assembly that is operable to turn steerable vehicle wheels and for effecting operation of an auxiliary apparatus, said apparatus comprising a steering valve assembly adapted to be connected in fluid communication with the motor assembly, said steering valve assembly including a steering valve member movable from an initial position to a first actuated position to port fluid to effect operation of the motor assembly to turn the vehicle wheels in a first direction, said steering valve member being movable from the initial position to a second actuated position to port fluid to effect operation of the motor assembly to turn the vehicle wheels in a second direction, a priority valve assembly adapted to be connected in fluid communication with said steering valve assembly, auxiliary apparatus and pump, said priority valve assembly including a priority valve member movable between a first position in which said priority valve member is effective to direct at least a major portion of the fluid flow from the pump to the auxiliary apparatus and a second position in which said priority valve member is effective to direct at least a major portion of the fluid flow from the pump to said steering valve assembly, electrically energizable means for moving said priority valve member between its first and second positions, and switch means for effecting operation of said electrically energizable means in response to movement of said steering valve member from the initial position to move of said priority valve member through at least a portion of its range of movement, said switch means including a switch actuator connected to said steering valve member for movement therewith under the influence of forces transmitted from said steering valve member to said switch actuator.

26. An apparatus as set forth in claim 25 further including a gerotor gear set disposed in said housing and including relatively movable internally and externally toothed members which cooperate to at least partially define pockets which expand and contract upon relative rotational and orbital movement between said toothed members, said steering valve member being connected to one of said toothed members for movement relative to said housing between the initial and the first and second actuated positions under the influence of forces transmitted from said one toothed member to said steering valve member, said steering valve member being effective to port fluid from the contracting pockets to the motor assembly when said steering valve member is in the first actuated position and when said steering valve member is in the second actuated position.

27. An apparatus as set forth in claim 26 further including wobble shaft means for connecting said steering valve member with said one toothed member such that said steering valve member rotates with said one toothed member upon rotation of said one toothed member about its central axis and such that said one toothed member can orbit relative to the other toothed member without moving said steering valve member.

28. An apparatus as set forth in claim 25 wherein said switch means further includes first and second spaced apart surface areas and an intermediate surface area disposed between said first and second surface areas, said intermediate surface area being electrically insulated from said first and second surface areas, said switch means further including a contact member which engages (a) said intermediate surface area when said steering valve member is in the initial position, (b) said first surface area when said steering valve member is in the first actuated position, (c) said second surface area when said steering valve member is in said second actuated position.

29. An apparatus as set forth in claim 28 wherein said contact member engages said first surface area upon initiation of movement of said steering valve member from the initial position toward the first actuated position and prior to said steering valve member reaching the first actuated position to effect operation of said electrically energizable means to move said priority valve member toward the second position after movement of said steering valve member away from the initial position and prior to said steering valve member reaching the first actuated position, said contact member engaging said second surface area upon initiation of movement of said valve member from the initial position toward the second actuated position and prior to said steering valve member reaching the second actuated position to effect operation of the electrically energizeable means move said priority valve member toward the second position after movement of said steering valve member from the initial position and prior to said steering valve member reaching the second actuated position.

30. An apparatus as set forth in claim 25 wherein said switch means effects operation of said electrically energizeable means to move said priority valve member toward the first position in response to movement of said steering valve member from one of the actuated positions to the initial position, said apparatus further including time delay means for delaying operation of said electrically energizeable means to move said priority valve member toward the first position until a predetermined time period has elapsed after movement of said steering valve member from one of the actuated positions to the initial position.

31. An apparatus as set forth in claim 25 wherein said housing includes a surface means defining a first chamber section in which said steering valve member is disposed and a second chamber section in which said switch means is disposed, said first and second chamber sections being connected in fluid communication.

32. An apparatus as set forth in claim 31 further including connector means extending between said chamber sections for connecting said switch actuator with said steering valve member, said connector means being movable relative to said housing with said steering valve member and being free of engagement with seals.

33. An apparatus as set forth in claim 25 further including a stationary valve surface at least partially circumscribing said steering valve member, said valve member being rotatable relative to said stationary valve surface to adjust the initial position of said steering valve member, said switch means including fixed and movable contacts which are moved relative to each other by said switch actuator, and means for transmitting forces between said fixed and movable contacts, said steering valve member and said switch actuator to maintain the angular relationship therebetween constant during relative rotation between said steering valve member and said valve surface to adjust the initial position of said steering valve member.

34. A hydrostatic steering controller for directing fluid flow from a source to a steering motor and for providing an electrical control signal, said controller comprising a positive displacement metering unit including an outer gerotor gear with internal teeth and an inner gerotor gear with external teeth, said inner gear having one less tooth than said outer gear, said inner and outer gears being rotatable and orbital relative to each other to expand and contract fluid pockets formed between their teeth, an input shaft rotatable about its central axis, a control valve, means for transmitting torque from said input shaft through said metering unit to shift said control valve from a neutral position to an operating position, said means including means for coupling the input shaft to said outer gear so that said outer gear rotates jointly with said input shaft about the central axis of said input shaft, means coupling said inner gear with said control valve so that said control valve rotates jointly with said inner gear and said inner gear can orbit relative to said outer gear, electrical switch means including a fixed contact, a movable contact, and an actuator, means supporting said actuator for rotation about said central axis to effect movement of said movable contact into engagement with said fixed contact, and means coupling said actuator with said control valve for joint rotation therewith, whereby rotation of said control valve away from said neutral position rotates said actuator to move said movable contact into engagement with said fixed contact to provide the electrical signal.

35. A hydrostatic controller as defined in claim 34 wherein said metering unit and said control valve are disposed within a first housing section, said fixed and movable contacts being disposed within a second housing section connected to said first housing section, said second housing section being rotatable relative to said first housing section to adjust the neutral position of said control valve.

36. A hydrostatic controller as defined in claim 35 wherein said first and second housing sections each include a fluid chamber, said fluid chamber in said second housing section communicating with the fluid chamber in said first housing section so that said contacts are immersed in fluid in said second housing section.

37. A control unit for controlling fluid flow to a fluid motor and providing an electrical output signal to effect a control function, said control unit comprising a housing, an input shaft rotatable about its central axis and extending into said housing, a rotatable control valve member disposed in said housing and biased to a neutral position and movable therefrom to an operating position to control flow to the fluid motor, said control valve member being rotatable about its central axis from the neutral position to the operating position, biasing spring means connected with said valve member and said housing for acting on said valve member to return it from the operating position to the neutral position, a mechanical torque-transmitting connection between said input shaft and said control valve member for effecting movement of said control valve member to a degree determined by the magnitude of the torque applied to said input shaft, said torque-transmitting connection including a fluid metering unit comprising relatively rotatable and orbital inner and outer gears, said outer gear having internal teeth and said inner gear having external teeth, said outer gear having one more tooth than said inner gear and the teeth of said gears meshing and defining fluid pockets which expand and contract on relative orbital and rotational movement thereof, said outer gear being rotatable about a central axis which is common with the central axis of said input shaft and is connected to said input shaft for joint rotation about said common central axis, said inner gear being orbitable in said outer gear, a drive link connecting said inner gear to said control valve member, said drive link having a central axis disposed at an angle to said common central axis of said outer gear and said input shaft, said drive link coupling said inner gear with said control valve member for joint rotation about their respective central axes while allowing said inner gear to orbit relative to said outer gear in metering fluid flow, a commutator valve connected in fluid communication with said control valve member for directing fluid flow from said control valve member to said fluid pockets and from said fluid pockets to said control valve member for direction by said control valve member to said fluid motor, said input shaft being rotatable after movement of the control valve to an operating position to effect relative rotational and orbital movement of said inner and outer gears to meter fluid flow to the fluid motor, switch means actuable from a first condition to a second condition to provide the electrical output signal, and actuator means connecting said switch means with said control valve member for effecting actuation of said switch means from the first condition to the second condition upon movement of said control valve member from the neutral position to the operating position.

38. A control unit as set forth in claim 37 wherein said inner and outer gears are disposed adjacent to a first axial end portion of said control valve member and said switch means is disposed adjacent to a second axial end portion of said control valve member.

39. A control unit as set forth in claim 38 wherein said biasing spring means is connected to said first axial end portion of said control valve member and is connected to said housing at a location adjacent to said second axial end portion of said control valve member.

40. A control unit as set forth in claim 37 wherein said housing includes a first section in which said fluid metering unit and said control valve member are disposed and a second section in which said switch means is disposed, said actuator means extending between said first and second housing sections, said second housing section, switch means, actuator means, biasing spring means and control valve member being rotatable together relative to said first housing section about the central axis of said control valve member to vary the neutral position of said control valve member relative to said first housing section.

41. A control unit as set forth in claim 40 wherein a first end portion of said biasing spring means is connected to said control valve member and a second end portion of said biasing spring means is connected to said second section of said housing.

42. A control unit as set forth in claim 40 wherein said first and second housing sections are connected in fluid communication with each other.

43. A control unit for effecting operation of a fluid motor to turn steerable vehicle wheels and provide an electrical output signal to effect a control function, comprising a housing having first and second sections, a rotatable input shaft extending into said first housing section, a rotatable valve member disposed in said first housing section and connected with said input shaft, said valve member being rotatable about its central axis from a neutral position to an operating position in response to rotation of said input shaft, biasing spring means disposed in said first housing section and connected with said valve member and said second housing section for acting on said valve member to rotate it from the operating position to the neutral position, switch means disposed in said second housing section and actuatable from a first condition to a second condition to provide the electrical output signal, actuator means connecting said switch means with said valve member for effecting actuation of said switch means from the first condition to the second condition upon rotation of said valve member from the neutral position to the operating position, and connector means interconnecting said first and second housing sections, said connector means being operable from an engaged condition to a released condition to enable said second housing section, switch means, actuator means, valve member and biasing spring means to be rotated together relative to said first housing section and said input shaft to vary the location of the neutral position of said valve member relative to said first housing section while maintaining the spatial relationship between said control valve member, actuator means and switch means substantially constant.

44. A control unit as set forth in claim 43 wherein said actuator means includes a pair of force transmitting sections which extend through openings formed in said second housing section, said biasing spring means being connected with said second housing section at a location between said openings.

45. A control unit as set forth in claim 43 wherein said first and second housing sections are connected in fluid communication with each other.

46. A control unit as set forth in claim 43 further including metering means disposed in said first housing section for metering fluid flow to the fluid motor, said fluid metering means including relatively rotatable and orbital inner and outer gears connected with said input shaft and said valve member, said outer gear having internal teeth and said inner gear having external teeth, said outer gear having one more tooth than said inner gear and the teeth of said gears meshing and defining fluid pockets which expand and contract upon relative rotational and orbital movement between said gears, a wobble shaft interconnecting one of said gears and said valve member, said wobble shaft having a central axis which is skewed relative to the central axis of said valve member, said wobble shaft being rotatable about its central axis to transmit rotary motion between said one gear and said valve member, said wobble shaft being pivotable about one end portion of said wobble shaft to accommodate orbital motion between said gears, said input shaft being connected with the other of said gears to effect rotary movement of said other gear upon rotation of said input shaft.

* * * * *

UNITED STATES PATENT AND TRADEMARK OFFICE
CERTIFICATE OF CORRECTION

PATENT NO. : 4,457,132

DATED : July 3, 1984

INVENTOR(S) : Maurice P. Roberts

It is certified that error appears in the above-identified patent and that said Letters Patent are hereby corrected as shown below:

Column 17, line 38, change "relaive" to -- relative --.

Signed and Sealed this

Twentieth Day of November 1984

[SEAL]

Attest:

GERALD J. MOSSINGHOFF

Attesting Officer

Commissioner of Patents and Trademarks